(12) United States Patent
Mahdi et al.

(10) Patent No.: US 9,176,340 B1
(45) Date of Patent: Nov. 3, 2015

(54) AMLCD BACKLIGHT ANGULAR CONTROL USING FIBEROPTIC FACE PLATE

(75) Inventors: Khanjer Mahdi, Santa Clara, CA (US); Thomas G. Fiske, Campbell, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 710 days.

(21) Appl. No.: 12/571,209

(22) Filed: Sep. 30, 2009

(51) Int. Cl.
*G02F 1/1335* (2006.01)
*F21V 8/00* (2006.01)
*G02B 6/08* (2006.01)

(52) U.S. Cl.
CPC ........ *G02F 1/133524* (2013.01); *G02B 6/0005* (2013.01); *G02B 6/08* (2013.01)

(58) Field of Classification Search
CPC ... G02F 1/133524; G02B 6/08; G02B 6/0005
USPC ........................................................ 349/159
See application file for complete search history.

(56) References Cited

U.S. PATENT DOCUMENTS

| | | | |
|---|---|---|---|
| 4,591,232 A * | 5/1986 | Jeskey | 385/120 |
| 5,329,386 A * | 7/1994 | Birecki et al. | 349/63 |
| 5,543,870 A * | 8/1996 | Blanchard | 353/74 |
| 5,959,711 A | 9/1999 | Silverstein et al. | |
| 6,457,834 B1 * | 10/2002 | Cotton et al. | 353/122 |
| 6,806,931 B1 * | 10/2004 | Kuijper | 349/121 |
| 6,999,665 B2 * | 2/2006 | Veligdan | 385/120 |
| 2007/0081323 A1 * | 4/2007 | Yun et al. | 362/97 |
| 2007/0132915 A1 * | 6/2007 | Mi | 349/64 |

OTHER PUBLICATIONS eMagin: Glossary of Terms, printed from internet website http://www.emagin.com/technology/glossary.php on May 18, 2009, pp. 1-4.
Technical Standard Order C115-b (TSO-C115b), Airborne Area Navigation Equipment Using Multi-Sensor Inputs dated Sep. 30, 1994, DOT, FAA, Aircraft Certification Service, pp. 1-11.

* cited by examiner

*Primary Examiner* — Dennis Y Kim
(74) *Attorney, Agent, or Firm* — Angel N. Gerdzhikov; Donna P. Suchy; Daniel M. Barbieri

(57) ABSTRACT

A fiber optic face plate for a display. The display includes a light source, a transparent cover, a diffuser, a brightness enhancement film, and the fiber optic face plate. The fiber optic face plate allows light to be transmitted through the fiber optic face plate based on the light being incident on the fiber optic face plate within an angular region defined by an acceptance cone. The fiber optic face plate absorbs light based on the light being incident on the fiber optic face plate outside the angular region defined by the acceptance cone. A top angular extent of the acceptance cone is positioned at a positive angle from a fiber optic face plate normal and a bottom angular extent of the acceptance cone is positioned at a negative angle from the fiber optic face plate normal.

20 Claims, 7 Drawing Sheets

AMLCD BACKLIGHT ANGULAR CONTROL USING FIBEROPTIC FACE PLATE

BACKGROUND

The present disclosure relates generally to the field of displays. More specifically, the disclosure relates to systems for and methods of reducing light leakage.

An aircraft which includes a bubble canopy may be subject to stray light from the cockpit display. This stray light may reflect off the canopy and interfere with the pilot's ability to see outside the aircraft. When the aircraft is flown at night or during low-visibility conditions, interference associated with the stray light can be more problematic. The source of the stray light may be from the cockpit display which may be an active-matrix liquid crystal display ("AMLCD"). The AMLCD may allow light to exit the display outside of the designed head box at high angles.

Thus, there is a need for systems and methods which may reduce stray light from displays. Further, there is a need for an avionics' display that reduces adverse affects of light interference from stray light from the display. In addition, there is a need for a display which reduces stray light interference during night flights and/or low-visibility conditions.

SUMMARY

One embodiment of the disclosure relates to a fiber optic face plate for a display. The display includes a light source, a transparent cover, a diffuser, a brightness enhancement film, and a fiber optic face plate. The fiber optic face plate may allow light to be transmitted through the fiber optic face plate based on the light being incident on the fiber optic face plate within an angular region defined by an acceptance cone. The fiber optic face plate may absorb light based on the light being incident on the fiber optic face plate outside the angular region defined by the acceptance cone. A top angular extent of the acceptance cone may be positioned at a positive angle from a fiber optic face plate normal and a bottom angular extent of the acceptance cone may be positioned at a negative angle from the fiber optic face plate normal.

Another embodiment of the disclosure relates to a display which includes a light source, a transparent cover, a diffuser, a brightness enhancement film, a fiber optic face plate, and an image direction film. The light source emits light. The diffuser scatters the light. The brightness enhancement film may transmit light into a range of angles around a normal direction of the brightness enhancement film to allow light to be incident on the fiber optic face plate within an angular region defined by an acceptance cone of the fiber optic face plate. The fiber optic face plate may allow light to be transmitted through the fiber optic face plate based on the light being incident on the fiber optic face plate within the angular region defined by the acceptance cone. The fiber optic face plate may absorb light based on the light being incident on the fiber optic face plate outside the angular region defined by the acceptance cone. The image direction film may offset an angular light distribution of the light. A top angular extent of the acceptance cone may be positioned at a first positive angle from a fiber optic face plate normal and a bottom angular extent of the acceptance cone may be positioned at a second positive angle from the fiber optic face plate normal.

Another embodiment of the disclosure relates to an aircraft display which includes a light source, a transparent cover, a diffuser, a brightness enhancement film, and a fiber optic face plate. The fiber optic face plate may allow light to be transmitted through the fiber optic face plate based on the light being incident on the fiber optic face plate within an angular region defined by an acceptance cone. The fiber optic face plate may absorb light based on the light being incident on the fiber optic face plate outside the angular region defined by the acceptance cone. A top angular extent of the acceptance cone may be positioned at a positive angle from a fiber optic face plate normal and a bottom angular extent of the acceptance cone may be positioned at a negative angle from the fiber optic face plate normal. The acceptance cone and the angular region may be based on aircraft data.

DETAILED DESCRIPTION OF THE EXEMPLARY EMBODIMENTS

Figure 1:
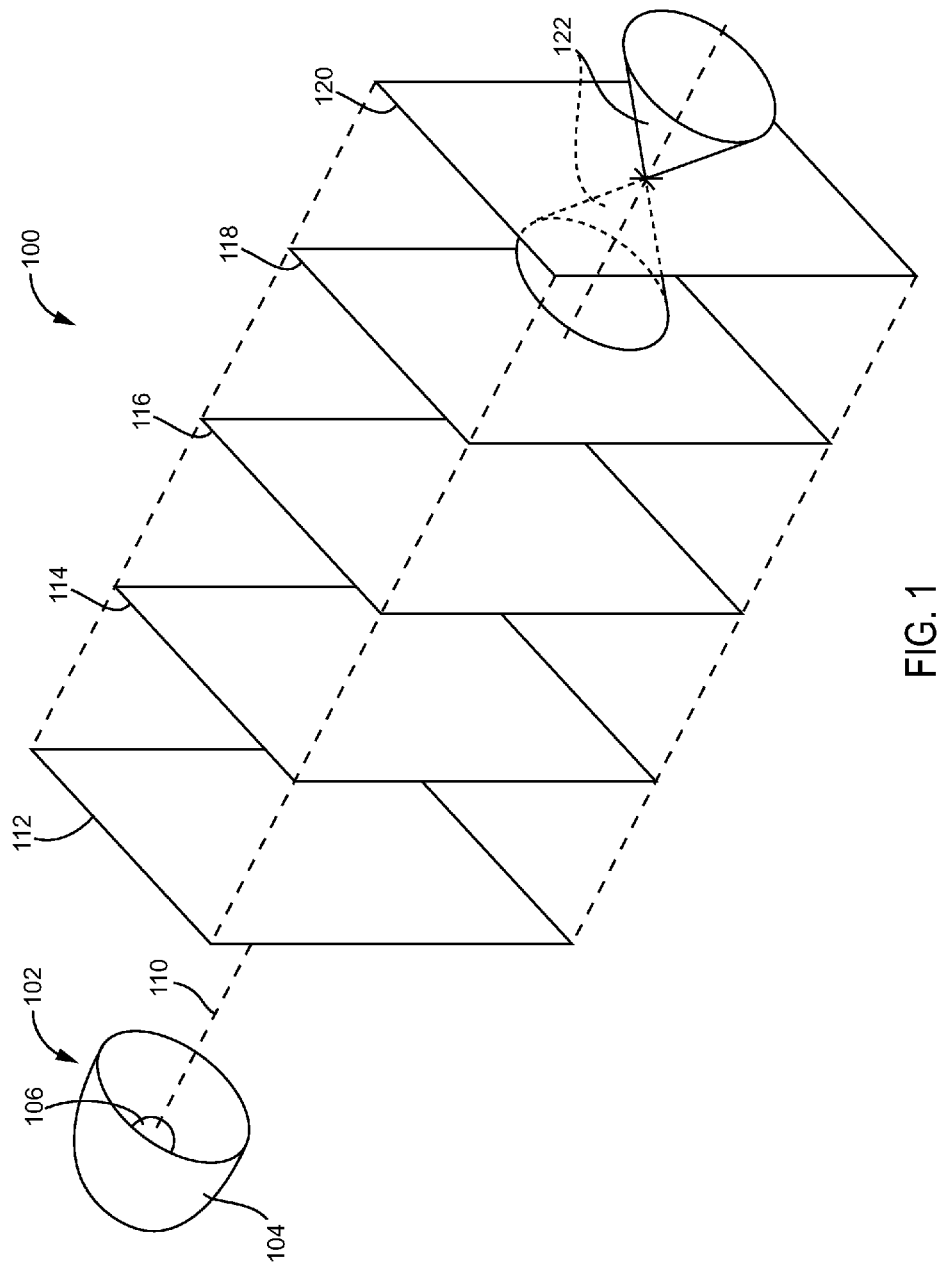
FIG. 1 is an illustration of a system utilizing the FOFP, according to an exemplary embodiment.

In an exemplary embodiment, the display may include a light source, an optically transparent cover, a diffuser, a brightness enhancement film ("BEF"), a dual brightness enhancement film ("DBEF"), and a fiber optic face plate ("FOFP"). The light source emits light. The diffuser scatters the light. The BEF may increase the light transmitted in a range of angles close to the normal direction of the BEF. The DBEF may be a reflective polarizing film that boosts the light throughput through an AMLCD. The FOFP may have an angular acceptance cone such that light incident on the FOFP within the acceptance cone may be transmitted through the FOFP and light incident outside the acceptance cone may be absorbed and not transmitted. In an exemplary embodiment, light that is transmitted within the acceptance cone of the FOFP may have the same angular extent on the exit side of the FOFP as it has on the entrance side of the FOFP. That is, light on the exit side of the FOFP may have the same angular extent as the acceptance cone. The axis of the acceptance cone may be oriented perpendicular to the FOFP. The FOFP may be constructed such that the angular extent of the acceptance cone is the same across the entire surface of the FOFP. The angular extent of the acceptance cone of the FOFP may be designed so as to substantially overlap with that of the BEF so as to increase the light throughput of the display. The collection of the diffuser, BEF, DBEF, and FOFP may be called the diffuser stack.

In an exemplary embodiment, the display may include a light source, an optically clear cover, a diffuser, a BEF, an image direction film ("IDF"), a DBEF, and an FOFP. The light source emits light. The diffuser scatters the light. The BEF may increase the light transmitted in a range of angles close to the normal direction of the BEF. The IDF may offset an angular distribution of light so that more light is transmitted into a range of angles that is not symmetric about the normal direction to the display. The FOFP may have an angular acceptance cone such that light incident on the FOFP within the cone may be transmitted through the FOFP and light incident outside the cone may be absorbed and not transmitted. The axis of the angular acceptance cone may be oriented perpendicular to the FOFP or at an angle of up to 90° with respect to the normal direction of the FOFP. The FOFP may be constructed such that the angular acceptance cone is the same across the entire surface of the FOFP. The FOFP may be constructed so that the direction of the center of the acceptance cone is substantially the same as the light distribution from the IDF. The collection of the diffuser, BEF, IDF, DBEF, and FOFP may be called the diffuser stack.

In an exemplary embodiment, an aircraft display may include a light source, a transparent cover, a diffuser, a BEF, an IDF, a DBEF, and an FOFP. All the elements may be designed and behave as described in this disclosure. The design and behavior of these elements may be based on aircraft data.

Referring to FIG. 1, an illustration of a system 100 utilizing an FOFP 120 is shown, according to an exemplary embodiment. In an exemplary embodiment, system 100 may include a backlight 102, a transparent cover 112, a diffuser 114, a BEF 116, a dual brightness enhancement film ("DBEF") 118, and FOFP 120. Backlight 102 may include a reflector 104 and a light source 106. FOFP 120 may include an acceptance cone 122. Light incident on the FOFP at angles within the acceptance cone 122 may be transmitted through the FOFP. Acceptance cone 122 is shown on both the entrance and exit sides of FOFP 120. Light incident on FOFP 120 at angles outside acceptance cone 122 may be absorbed by FOFP 120.

In an exemplary embodiment, diffuser 114 may diffuse, spread out, or scatter light from path 110. BEF 116 may reflect light incident at high angles and allow light to be transmitted at lower incident angles. The high angle light is re-reflected by diffuser 114 and light source 106 into a range of angles that BEF 116 may transmit. In exemplary embodiments, none, some, or all of this light may be transmitted by BEF 116. This property effectively increases the light transmitted in a range of angles close to the normal direction of BEF 116. BEF 116 may be a prismatic film. DBEF 118 may be a reflective polarizing film that transmits light of chiefly one linear polarization state and reflects light of chiefly the other polarization state. Some of the reflected light is re-reflected by the elements behind DBEF 118 and rotated into the polarization state that DBEF 118 transmits. In this way DBEF 118 may boost the light throughput through an AMLCD. FOFP 120 may absorb light from backlight 102 outside an acceptance cone 122. In an exemplary embodiment, acceptance cone 122 may be greater than plus or minus forty-two degrees in angular extent. In other exemplary embodiments, acceptance cone 122 may be greater than plus or minus one degree, two degrees, three degrees, four degrees, and so forth all the way up to plus or minus ninety degrees in angular extent.

In an exemplary embodiment, FOFP 120 may have various values of acceptance cone angular extent and various levels of absorption for light incident outside acceptance cone 122. The angular extent of acceptance cone 122 may be adjusted by the selection of the optical index of the core and cladding materials. The absorption level of light incident on FOFP 120 outside acceptance cone 122 may be adjusted by setting the distribution of black glass fibers (e.g., extra-mural absorption) in FOFP 120, by the selection of black glass cladding, by the thickness selection, or any combination thereof.

In an exemplary embodiment, FOFP 120 may utilize extra-mural absorption and/or opaque cladding material to reduce light from propagating through the AMLCD at angles greater than the acceptance angle of acceptance cone 122. In an exemplary embodiment, by removing the high angle light, system 100 may have reduced canopy reflections in an aircraft cockpit. In an exemplary embodiment, FOFP 120 may be coated with a perimeter jacket.

Figure 2A:
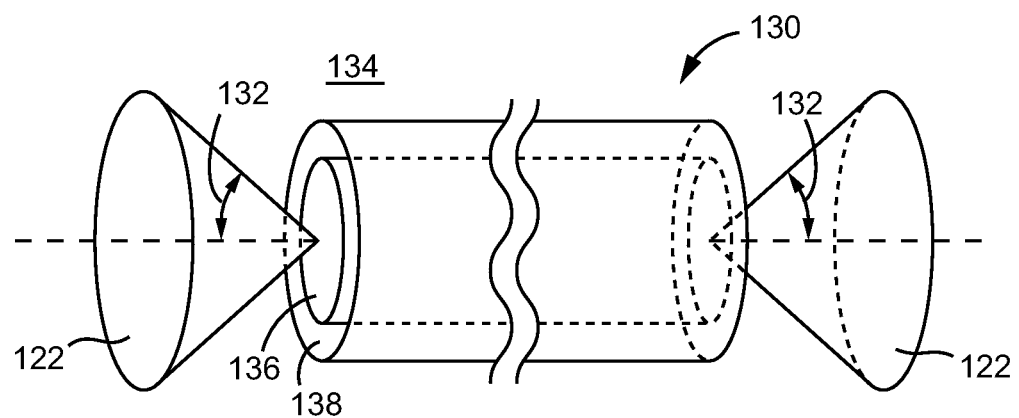
FIGS. 2A-2B are illustrations of the behavior of light transmitted through an optical fiber and a fiber optic faceplate.

FIG. 2A illustrates acceptance cone 122 on the entrance and exit faces of a fiber 130 that may be set by the relative refractive indices of the glass which makes up the core and cladding material of the fibers. The refractive index of the cladding material may be less than that of the core material. This allows for the effective transmission of light through the fibers via total internal reflection. A specific acceptance cone, $Theta_{max}$ 132. may be related to the refractive indices via the following relationship: $Theta_{max} = SIN^{-1} (1/N_O * SQRT(N^2_{core} - N^2_{clad}))$, where $N_O$ is a refractive index of air 134, $N_{core}$ is a refractive index of the core material 136, and $N_{clad}$ is a refractive index of the cladding material 138.

For example, if $N_{core}$ is 1.6 and $N_{clad}$ is 1.5, then $Theta_{max}$ will be 33°. Different values for $Theta_{max}$ may be obtained by choosing core material and cladding material of different refractive index (as long as $N_{core}$ is greater than $N_{clad}$). In another example, if $N_{core}$ is 1.75 and $N_{clad}$ is 1.55, then $Theta_{max}$ will be 54°.

Figure 2B:
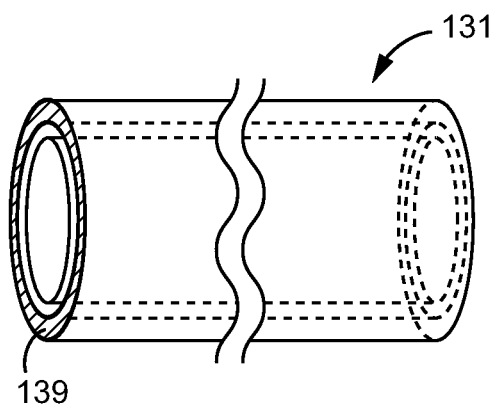

If light is incident on the face of FOFP 120 outside acceptance cone 122, some of the light may not be totally internally reflected by the fiber in FIG. 2A and will leak out of the fiber. This light will traverse FOFP 120 in an uncontrolled fashion and may exit FOFP 120 outside acceptance cone 122. In order to keep this from happening, a method of absorbing light incident on FOFP 120 outside acceptance cone 122 may be employed. In FIG. 2B, the absorption level being adjusted is shown, according to an exemplary embodiment. The absorption level may be adjusted by substituting some of the clear fibers in FOFP 120 with black glass fibers. This is called Extra-Mural Absorption ("EMA") in FOFP 120. The absorption level may also be adjusted by adding another black glass cladding layer 139 outside of the normal cladding layer for each fiber 131 in FOFP 120. Without one of these methods in place, light outside the acceptance area of acceptance cone 122 may be transmitted through FOFP 120. Utilizing either of these methods may allow the light going through FOFP 120 outside the acceptance area of acceptance cone 122 to be absorbed by the black glass. The absolute level of absorption may be determined by the amount of EMA used or by the thickness of FOFP 120 (i.e. more absorption may result from a thicker FOFP 120).

Angular region may include the range of angles which allows the light to pass through FOFP 120. Angular region may be defined by acceptance cone 122. Angular region may include a region which is a first angular region angle from acceptance cone 122 and/or FOFP 120 and a second angular region angle from acceptance cone 122 and/or FOFP 120. First angular region angle and second angular region angle may be any angle (e.g., zero to ninety degrees). Further, first angular region angle and second angular region angle may be the same angle (e.g., both forty degrees) or may be different angles (e.g., first angular region angle is thirty degrees and second angular region angle is fifty-three degrees). The region outside of angular region may include a first non-angular region angle and a second non-angular region angle from acceptance cone 122 and/or FOFP 120. First non-angular region angle and second non-angular region angle may be any angle (e.g., zero to ninety degrees).

Figure 3:
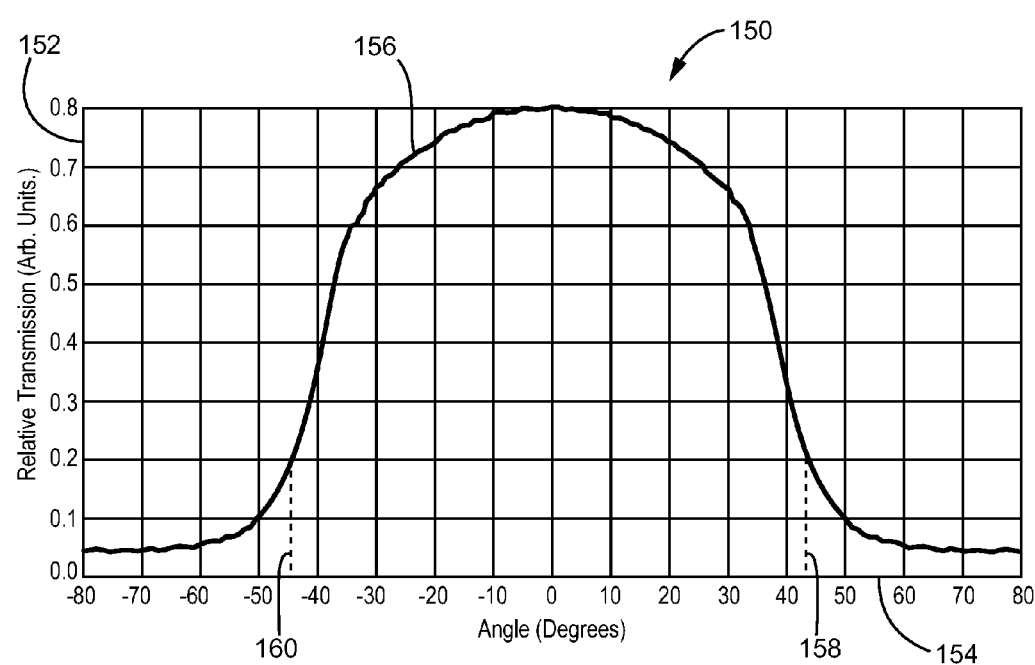
FIG. 3 is a graph of the transmission versus the inclination angle for the diffuser stack, according to an exemplary embodiment.

In FIG. 3, a graph of the transmission versus the inclination angle for the diffuser stack 150 is shown, according to an exemplary embodiment. The relative transmission is displayed on a y-axis 152 and the angle is displayed on an x-axis 154. In this graph, the maximum transmission is around 80%. The transmission outside the acceptance area of acceptance cone 122 is approximately 5% which may be a result of utilizing one of the methods disclosed above. In this exemplary embodiment, the angle of acceptance cone 122 ranges from a first point 158 to a second point 160. First point 158 may be positive forty-two degrees. Second point 160 may be negative forty-two degrees.

In another exemplary embodiment, $N_{core}$ and $N_{clad}$ may be selected so that the acceptance area of acceptance cone 122 may be approximately 32°. The absorption method may be deployed so as to reduce transmission of light with incident angles outside acceptance cone 122 to very low levels (e.g., approximately 1% or less).

Figure 4:
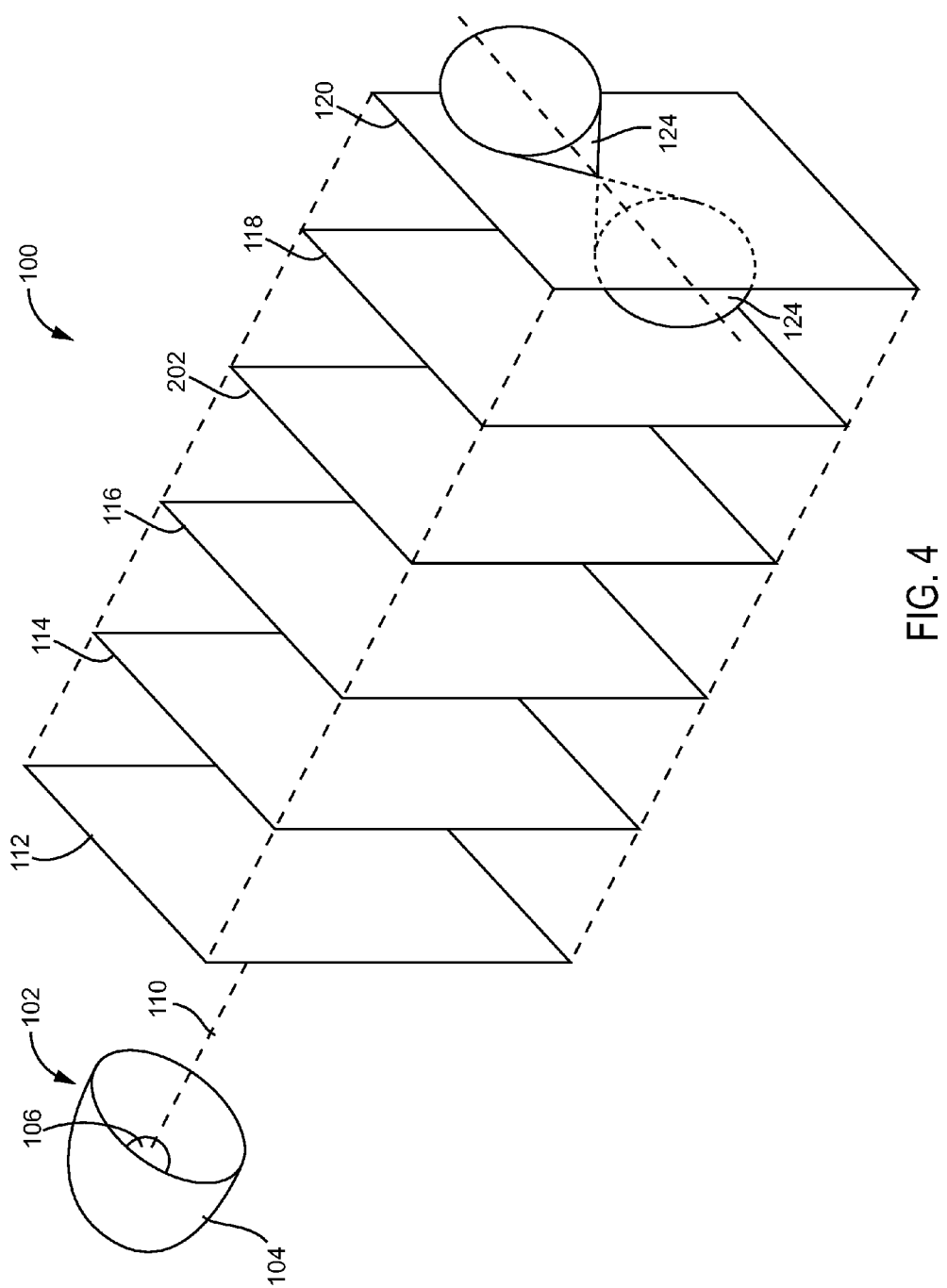
FIG. 4 is an illustration of a system utilizing the FOFP with an IDF, according to an exemplary embodiment.

In FIG. 4, an illustration of a system utilizing FOFP 120 with an IDF 200 is shown, according to an exemplary embodiment. System utilizing FOFP 120 with an IDF 200 may include backlight 102, transparent cover 112, diffuser 114, BEF 116, an IDF 202, DBEF 118, FOFP 120, and FOFP acceptance cone 124. In exemplary embodiments, the top angular extent of acceptance cone 122 and the bottom angular of extent of acceptance cone 122 may be both at positive angles, negative angles, or one may be at a positive angle while the other is at a negative angle. For example, FIG. 4 shows the top angular extent and the bottom angular extent of acceptance cone 122 both being at positive angles. The angle of bottom angular extent and the angle of top angular extent may be based on the offset angle of acceptance cone 122.

In an exemplary embodiment, the insertion of IDF 202 may be utilized to manage the general directivity of the light from backlight 102. In an exemplary embodiment, IDF 202 may be one element of the backlight diffuser stack. In an exemplary embodiment, IDF 202 may be inserted in the stack in such a way so as to maximize the transmission of light into the desired direction. IDF 202 may be utilized in conjunction with the rest of the elements in the diffuser. IDF 202 may be a prismatic film that biases the angular light distribution to an off-normal direction.

Figure 5:
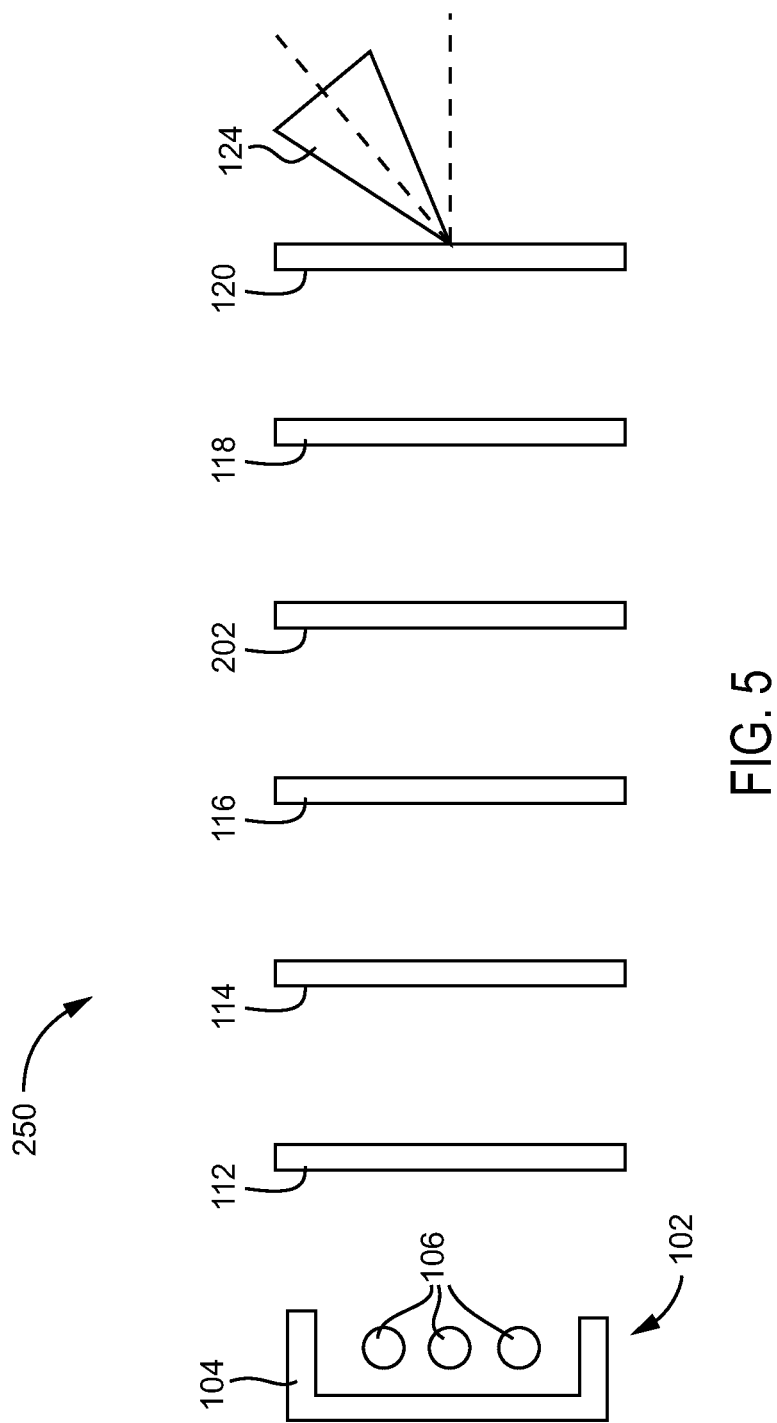
FIG. 5 is an illustration of directing the light towards the face utilizing the IDF, according to an exemplary embodiment.

In FIG. 5, an illustration of directing the light towards the face plate utilizing the image direction film 250 is shown, according to an exemplary embodiment. Backlight 102 may emit light that goes through transparent cover 112, diffuser 114, BEF 116, IDF 202, and DBEF 118. This combination of elements may angularly redirect much of the light from backlight 102 into FOFP acceptance cone 124 of FOFP 120. In FIG. 5, only the exit side of FOFP acceptance cone 124 is shown. In exemplary embodiments, image direction film 202 may be utilized with the light recycling techniques relating to BEF 116 and DBEF 118.

In an exemplary embodiment, image direction film 202 may be inserted into the stack to offset the angular light distribution by an upward bias (e.g., one degree, five degrees, ten degrees, fifteen degrees, twenty degrees, twenty-five degrees, etc—up to 80 degrees). It should be noted that a bias in any direction, up, down, right, left or a combination, may also be utilized. In an exemplary embodiment, FOFP 120 may also be biased in order to allow FOFP acceptance cone 124 to be adjusted to the same angular direction. In an exemplary embodiment, the fibers of FOFP 120 may be at a specific angle relative to the normal of the faceplate in order to affect this acceptance angle behavior. In an exemplary embodiment, the angular light distribution for this stack may be seen in FIG. 6.

Figure 6:
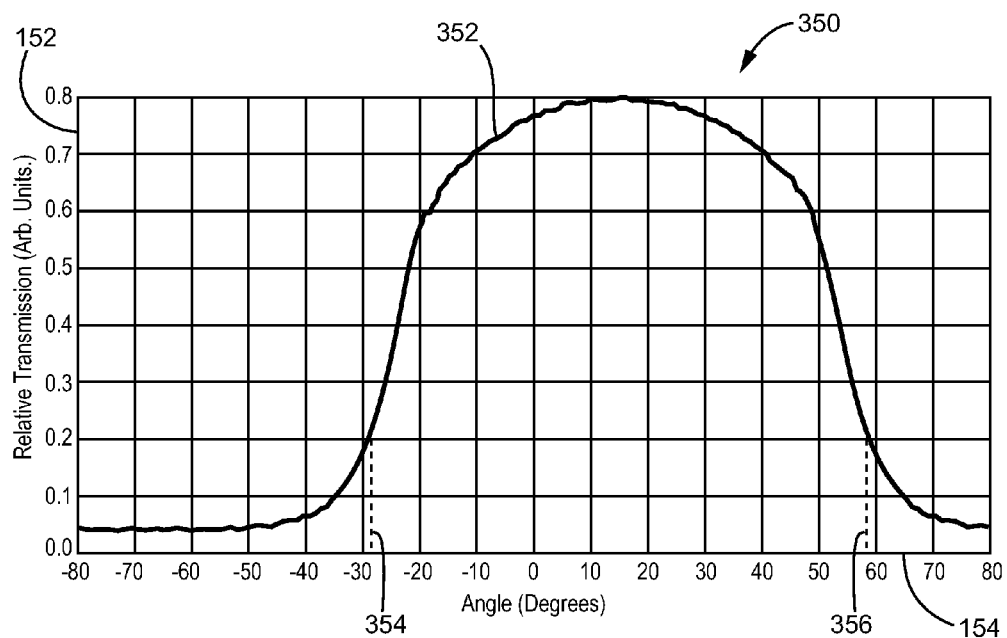
FIG. 6 is a graph of the transmission versus the inclination angle for the diffuser stack where the IDF and the FOFP have a fifteen degree bias angle.

In FIG. 6, a graph of the transmission versus the inclination angle for the diffuser stack where the IDF and the FOFP have a fifteen degree bias angle 350 is shown, according to an exemplary embodiment. The relative transmission is displayed on y-axis 152 and the angle is displayed on x-axis 154. In this graph, the maximum transmission is around 80%. In this exemplary embodiment, acceptance cone 122 angle goes from a first point 354 to a second point 356. First point 354 may be negative twenty-seven degrees. Second point 356 may be positive fifty-seven degrees.

Figure 7:
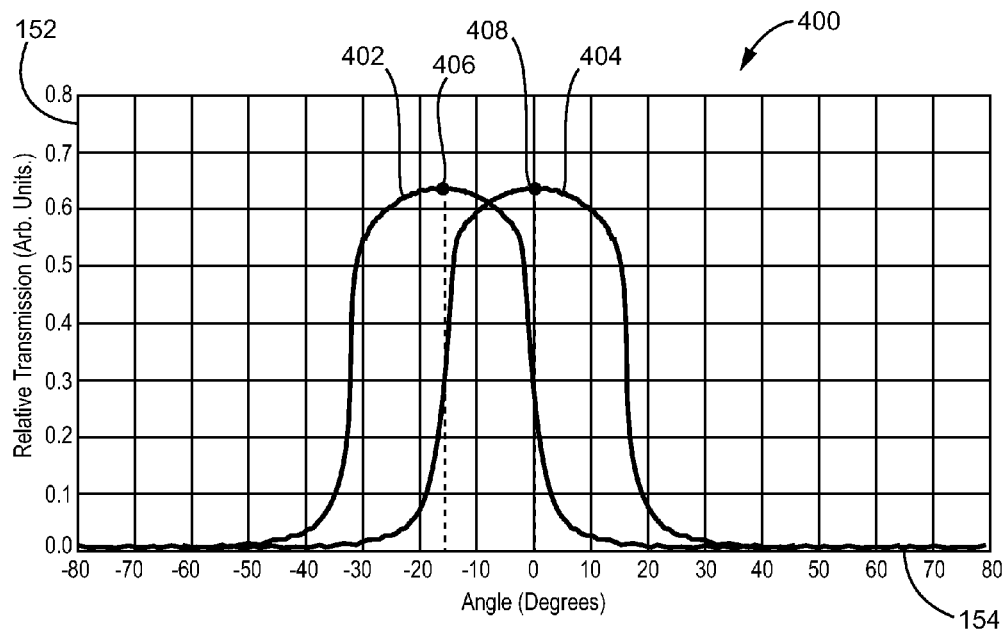
FIG. 7 is a graph of the FOFP transmission versus angle, according to an exemplary embodiment.

In FIG. 7, a graph of the FOFP transmission versus angle 400 is shown, according to an exemplary embodiment. In an exemplary embodiment, a first graph 402 may be for a system which has the position of the fibers angled to FOFP's 120 surface and where the data is plotted along the direction of the angled fibers. In other words, the fibers are not at a normal angle (i.e. perpendicular) to the surface of FOFP 120. In an exemplary embodiment, a second graph 404 may be for the same FOFP where the data is plotted across the direction of the angled fibers and the angle of peak transmission. First graph 402 has a first peak point 406 which may not be at zero degrees but is at negative fifteen degrees. Second graph 404 has a second peak point 408 which may be at zero degrees.

Figure 8:
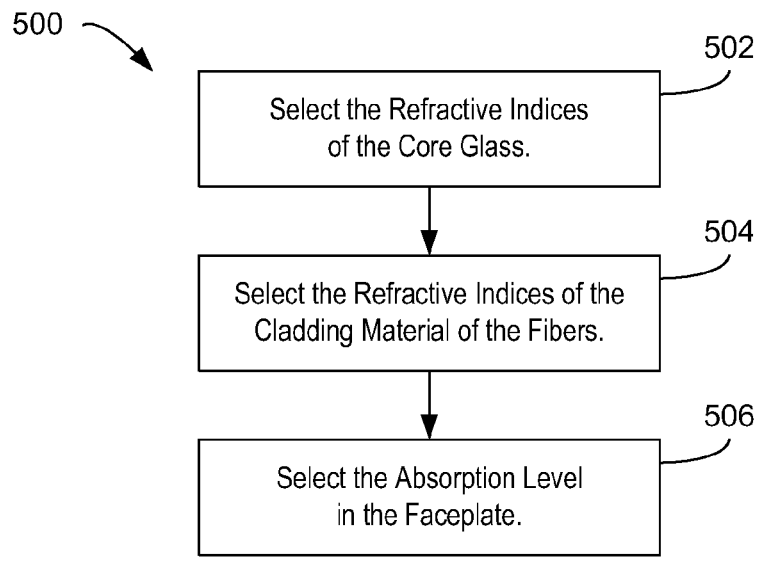
FIG. 8 is a flowchart of a selection process, according to an exemplary embodiment.

In FIG. 8, a flowchart of a selection process 500 is shown, according to an exemplary embodiment. The process starts with a processing logic 602 (See FIG. 9) selecting the refractive indices of the core glass (step 502). Processing logic 602 may select the refractive indices of the cladding material of the fibers (step 504). Processing logic 602 may select the absorption level in the face plate (step 506).

Figure 9:
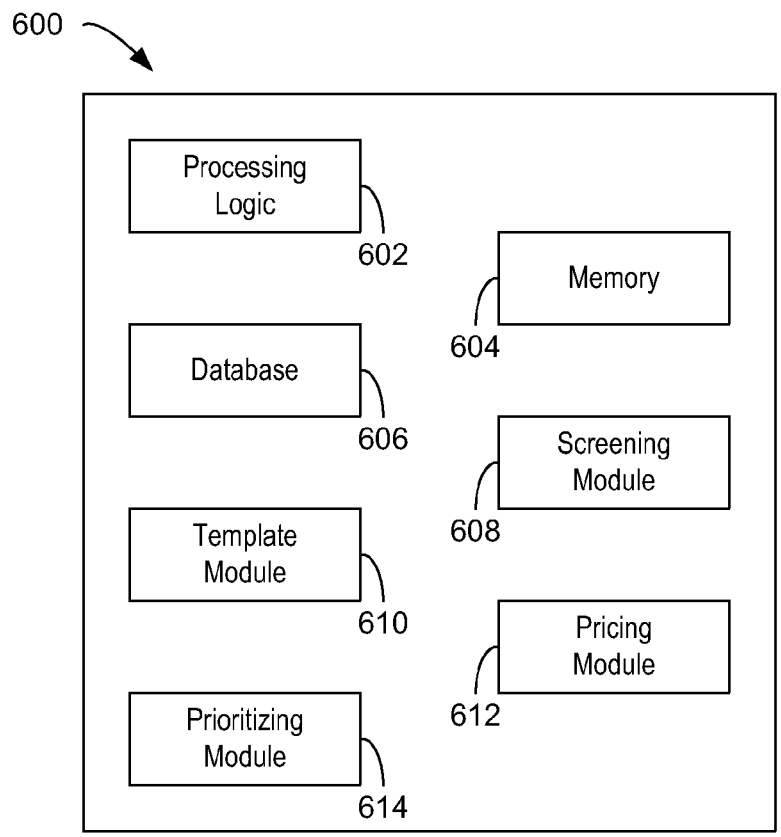
FIG. 9 is a block diagram, according to an exemplary embodiment.

In FIG. 9, a block diagram 600 is shown, according to an exemplary embodiment. The system may include processing logic 602, a memory 604, a database 606, a screening module 608, a template module 610, a pricing module 612, and a prioritization module 614. In an exemplary embodiment, processing logic 602 may obtain project information (e.g., data regarding AMLCD, FOFP, cockpit configuration, airplane configuration, etc.) which may be utilized to determine project criteria (e.g., refractive indices, biases, the utilization of any component (e.g., backlight 102, transparent cover 112, diffuser 114, BEF 116, DBEF 118, FOFP 120, and IDF 202), which method discussed above to utilize, etc.). Processing logic 602 may utilizing screening module 608 during this process. Screening module 608 may have screening data based on past projects, aircraft data, usage data (e.g., type of missions the aircraft may be utilized for), manufacturer data, cost data, construction timeline data, etc. Template module 610 may have templates (e.g., project type 1, project type 2, etc.) which may be based on data from screening module 608. Pricing module 612 may be utilized to obtain project pricing based on information generated by any other module, processing logic, or an external source. For example, pricing module 612 may obtain data regarding the aircraft's configuration and utilize this configuration data to obtain quotes (e.g., either real time or non-real time) from vendors to generate a project proposal for a client or potential client. Prioritization module 614 may prioritize the data obtained from screening module 608 based on preferences (e.g., client's, manufacturer's, or salesperson's).

In an exemplary embodiment, a display may include a light source, a transparent cover, a diffuser, a BEF, and an FOFP. The FOFP has an angular acceptance cone such that light incident on the FOFP within the cone may be transmitted through the FOFP and light incident outside the cone may be absorbed and not transmitted. The axis of the angular acceptance cone may be oriented perpendicular to the FOFP or at an angle of up to 90° with respect to the normal direction of the FOFP. The FOFP may be constructed such that the angular acceptance cone is the same across the entire surface of the FOFP.

In an exemplary embodiment, the acceptance cone of the FOFP may have a magnitude of forty-two degrees. In an exemplary embodiment, the display may include a DBEF. The DBEF may be a polarization recycling film that boosts the display brightness. The display may include an IDF. The IDF may offset an angular light distribution of the light from the backlight. The angular light distribution may be offset by fifteen degrees.

In an exemplary embodiment, a display which includes a light source, a transparent cover, a diffuser, a BEF, an IDF, and a FOFP. The light source emits light. The diffuser scatters the light. The BEF increases the light transmitted in a range of angles close to the normal direction of the BEF. The FOFP has an angular acceptance cone such that light incident on the FOFP within the cone may be transmitted through the FOFP and light incident outside the cone may be absorbed and not transmitted. The axis of the angular acceptance cone may be oriented perpendicular to the FOFP or at an angle of up to 90° with respect to the normal direction of the FOFP. The FOFP may be constructed such that the angular acceptance cone is the same across the entire surface of the FOFP. The angular extent of the FOFP may be designed so as to substantially overlap with that of the BEF so as to increase the light throughput of the display.

In an exemplary embodiment, the acceptance cone of the FOFP may extend from a positive angle of positive fifty-seven degrees and a negative angle of negative twenty-seven degrees. The display may further include a DBEF and an IDF. The DBEF may be a polarization recycling film that boosts the display brightness The IDF biases the angular light distribution to an off-normal direction. The angular light distribution of the light may be offset by fifteen degrees.

In an exemplary embodiment, an aircraft display may include a light source, a transparent cover, a diffuser, a BEF, DBEF, and an FOFP. The FOFP has an angular acceptance cone such that light incident on the FOFP within the cone may be transmitted through the FOFP and light incident outside the cone may be absorbed and not transmitted. The axis of the angular acceptance cone may be oriented perpendicular to the FOFP or at an angle of up to 90° with respect to the normal direction of the FOFP. The FOFP may be constructed such that the angular acceptance cone is the same across the entire surface of the FOFP. The extent and direction of the acceptance cone may be based on aircraft data (e.g., cockpit size, aircraft duty, cockpit coloring, cockpit dimensions, manufacturer data, etc.).

In an exemplary embodiment, the acceptance cone of the FOFP may extend from a positive angle of positive thirty-two degrees to a negative angle of negative fifty degrees. The aircraft display may further include a DBEF. The DBEF may be a polarization recycling film that boosts the display brightness The aircraft display may further include an IDF. The IDF may offset an angular light distribution.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hard-wired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A fiber optic face plate stack for a display, the display comprising a light source, a transparent cover, a diffuser, and a brightness enhancement film, the fiber optic face plate stack comprising:
   a fiber optic face plate;
   wherein the fiber optic face plate is configured to allow light to be transmitted through the fiber optic face plate based on the light being incident on the fiber optic face plate within an angular region defined by an acceptance cone, the fiber optic face plate being configured to absorb light based on the light being incident on the fiber optic face plate outside the angular region defined by the acceptance cone;
   wherein the fiber optic face plate is biased at a specific angle by orienting fibers of the fiber optic face plate at a fiber angle equal to the specific angle with respect to a fiber optic face plate normal, the specific angle being between 1 and 80 degrees, wherein the acceptance cone has a central axis biased at the specific angle; and
   an image direction film between the light source and the fiber optic face plate and configured to offset distribution of the light according to the specific angle, wherein the image direction film changes an angle of transmission of the light through the image direction film, wherein the light from the light source is redirected into the acceptance cone, wherein the image direction film is configured to bias the light at the specific angle.

2. The fiber optic face plate stack of claim 1, wherein the image direction film is a prismatic film for biasing the angular light distribution to an off-normal direction.

3. The fiber optic face plate stack of claim 1, wherein the specific angle is 15 degrees and the fiber angle is fifteen degrees.

4. The fiber optic face plate stack of claim 3, wherein the specific angle is 15 degrees.

5. The fiber optic face plate stack of claim 1, wherein angular light distribution is offset by fifteen degrees.

6. The fiber optic face plate stack of claim 1, wherein the specific angle is centered between a top angular extent and a bottom angular extent.

7. The fiber optic face plate stack of claim 6, wherein the specific angle is 15 degrees.

8. For use in a display including a light source, a transparent cover, a diffuser, and a brightness enhancement film, a fiber optic face plate stack comprising:
   a fiber optic face plate comprising:
   fibers being configured to allow light to be transmitted through the fiber optic face plate based on the light being incident on the fiber optic face plate within an angular region, the fiber optic face plate being configured to absorb light based on the light being incident on the fiber optic face plate outside the angular region, wherein the fiber optic face plate is biased at an offset angle by having the fibers at the offset angle relative to the normal of the face plate; and
   an image direction film adjacent to the brightness enhancement film and configured to offset the distribution of the light according to the offset angle, wherein the image direction film changes an angle of transmission of the light through the image direction film, wherein the light from the light source is redirected into the acceptance cone, wherein the image direction film is configured to bias the light at the offset angle.

9. The fiber optic face plate stack of claim 8, wherein a positive angle and a negative angle define the angular region, wherein the negative angle is negative fifty-seven degrees.

10. The fiber optic face plate stack of claim 9, wherein the positive angle is positive twenty-seven degrees.

11. The fiber optic face plate stack of claim 8, further comprising black fibers.

12. The fiber optic face plate stack of claim 8, wherein the offset angle is fifteen degrees.

13. A fiber optic face plate, the fiber optic face plate stack comprising:
   a fiber optic face plate comprising fibers configured to allow light to be transmitted through the fiber optic face plate based on the light being incident on the fiber optic face plate within an angular region, the angular region being at an offset angle, the fiber optic face plate being configured to absorb light based on the light being incident on the fiber optic face plate outside the angular region;

wherein the angular region is offset with respect to the fiber optic face plate normal, wherein the fibers are disposed at a fiber angle relative to the fiber optic face plate normal, wherein the fiber angle is the offset angle; and an image direction film adjacent to a brightness enhancement film and configured for offsetting the distribution of the light at the fiber angle, wherein the image direction film changes an angle of transmission of the light through the image direction film, wherein the light is redirected into the acceptance cone.

14. The fiber optic face plate stack of claim 13, wherein the offset angle is positive fifteen degrees.

15. The fiber optic face plate stack of claim 14, wherein the fiber angle is fifteen degrees.

16. The fiber optic face plate stack of claim 13, further comprising black fibers.

17. The fiber optic face plate stack of claim 13, wherein the fibers have black cladding.

18. The fiber optic face plate stack of claim 13, wherein the fibers are clear and include a normal cladding layer and a black cladding layer.

19. The fiber optic face plate stack of claim 13, wherein the fiber optic plate is attached to an LCD.

20. The fiber optic face plate stack of claim 13, wherein the angular region extends from a positive twenty-one degrees and to a negative forty-eight degrees.

\* \* \* \* \*